Jan. 19, 1932.　　　C. R. NICHOLS ET AL　　　1,841,976
ELECTRICAL PROSPECTING
Filed Aug. 29, 1928
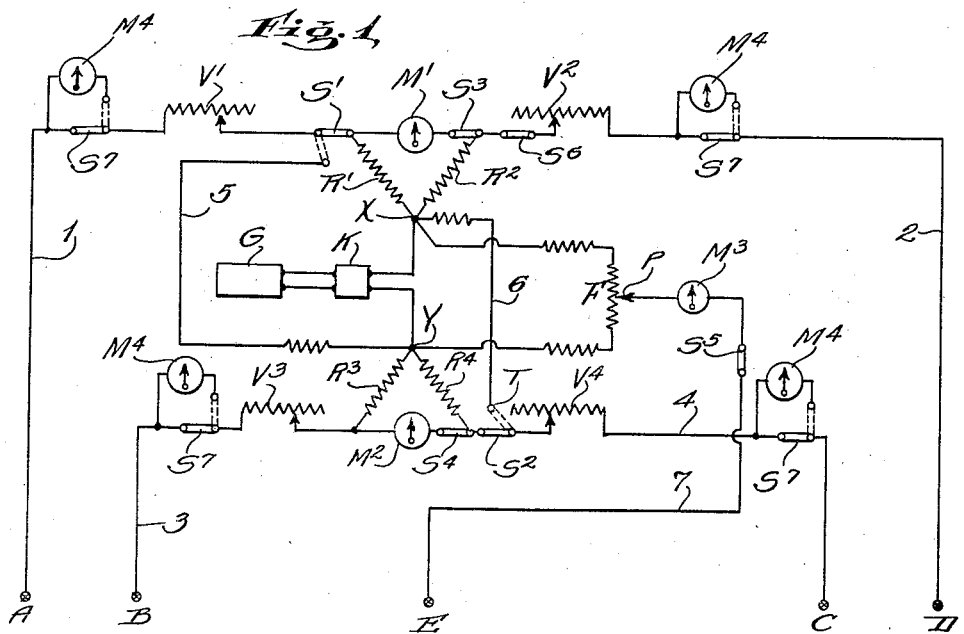
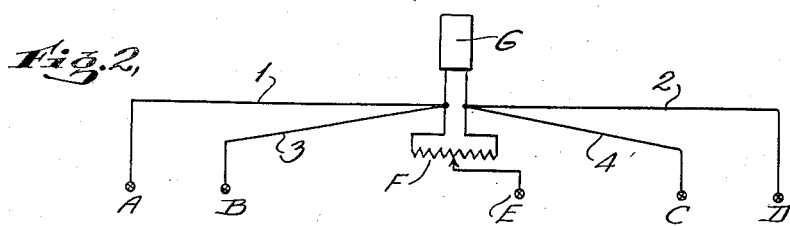
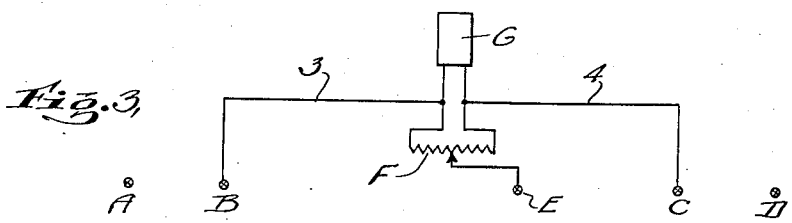
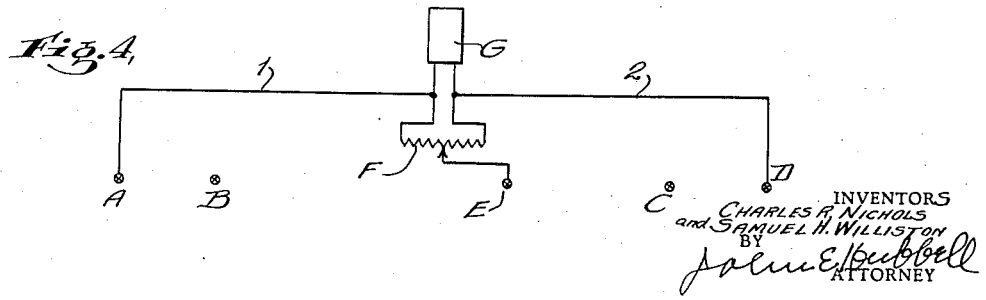
INVENTORS
CHARLES R. NICHOLS
and SAMUEL H. WILLISTON
BY
John E. Hubbell
ATTORNEY Patented Jan. 19, 1932

1,841,976

UNITED STATES PATENT OFFICE

CHARLES RODNEY NICHOLS AND SAMUEL H. WILLISTON, OF DALLAS, TEXAS

ELECTRICAL PROSPECTING

Application filed August 29, 1928. Serial No. 302,734.

The present invention relates to methods of, and apparatus for determining the location of and/or character of sub-surface bodies or earth portions differing in electrical resistance from adjacent earth portions by creating potential differences between spaced apart portions of the earth surface resulting in current flows through the earth underlying the exploration field.

One general object of the present invention is to provide a method of, and apparatus for the purpose specified which is especially adapted for rapid reconnaissance work along a line extending across the field to be explored, the invention being particularly well adapted for use in making observations along a roadway traversing the field to be explored.

Another general object of the present invention is to provide an improved method of and means for making effective use of the portion of the energization circuit or circuit system external to the earth itself to establish a definite or base potential at some point or points in said circuit or system, which may be utilized in determining the potential at an exploration point or points intermediate the points of energization, or in making measurements dependent on the difference between said base potential and the potential at some point on the earth's surface.

Those skilled in the art will understand that the term—point of energization—as used herein, does not mean a single mathematical point at which the external energization circuit is in contact with the earth, but ordinarily represents a central point about which or a line along which a plurality of electrodes, connected to the external energization circuit, are in contact with the earth. While it is possible in some special cases to make contact with the earth at each energization point by means of a single contact or electrode, such a single contact electrode must be of considerable size to minimize the earth contact resistance which ordinarily can best be minimized by means of a considerable number of electrodes or earth contacts at each point of energization.

Whether a single large electrode or a number of small electrodes be employed, the resistance between the earth and the external energizing circuit will ordinarily be different at different points of energization, due to such causes as moisture, compactness and other physical as well as chemical characteristics of the particular portions of the earth in immediate contact with or closely adjacent the earth contacting electrodes.

The utilization of a base potential point in the energizing circuit system external to the earth, requires that the effect of variations in the contact resistance at the different points of energization be eliminated or neutralized, and a specific object of the present invention is to provide a relative arrangement of the points of energization, and the circuit connections thereto, which will facilitate compensation for variations in contact resistance at the different points of energization by suitable adjustments of resistance in the external energization system and which will permit of effective use in various ways of the same energization points.

The various features of novelty which characterize our invention are pointed out with particularity in the claims annexed to and forming a part of this specification. For a better understanding of the invention, however, its specific objects attained with its use, reference should be had to the accompanying drawings and descriptive matter in which we have illustrated and described preferred embodiments of the invention.

Of the drawings:—

Fig. 1 is a diagrammatic representation of circuit connections employed in a preferred mode of carrying out the present invention; and Figs. 2, 3 and 4 are simplified diagrams each illustrating a different use, in making observations, of features of the circuit arrangements shown in Fig. 1.

In the drawings A, B, C and D represent points of energization at each of which contact is made with the earth in any usual or suitable manner, usually by inserting a plurality of electrodes or earth contacts in the earth at points distributed over a limited surface area the center of which may be regarded as determining the geographical location of the corresponding point of energization A, B, C, or D. In accordance with the present invention the energization points A, B, C and D are ordinarily located along a straight line. The distances between the various points of energization will vary with the conditions of operation, and in particular with the character of the observations to be made as is hereinafter explained. For carrying out rapid reconnaissance work in a preferred manner the distance between the intermediate points B and C may well be several thousand feet, while the distance between each intermediate point B or C and the adjacent end point A or D may well be something like 300 to 500 feet.

The points A, B, C and D are energized by a suitable source of electric current, preferably direct current, which may well be a direct current generator G. The circuit connections by which the generator G is connected to the electrodes or earth contacts at the points A, B, C and D comprise a separate energizing circuit branch running to each point of energization. In a resistance balancing condition of the apparatus shown in Fig. 1, in which the various switches $S'-S^7$, inclusive, are in the full line position shown in Fig. 1, the intermediate energization points B and C are connected to one terminal Y of the generator G and the points A and D are connected to the other terminal X of the generator. In this balancing condition of the apparatus shown in Fig. 1, the energizing circuit branch 1 for the energization point A includes a variable resistance $V'$ and a fixed resistance $R'$; the energizing circuit branch 2 for the energization point D includes a variable resistance $V^2$ and a fixed resistance $R^2$; the energization circuit branch 3 for the point B includes a variable resistance $V^3$ and a fixed resistance $R^3$; and the energizing circuit branch 4 for the point C includes a variable resistance $V^4$ and a fixed resistance $R^4$.

The fixed resistances $R'$ and $R^2$ are each connected to one terminal X of the generator G, and have definitely related resistance values. In some cases their resistance values may be equal, while in other cases the resistance value of one may be definitely greater than that of the other. A sensitive galvanometer $M'$ connected between the terminals of the resistances $R'$ and $R^2$ remote from the generator G forms a means for indicating whether or not the terminals of the resistances $R'$ and $R^2$ to which it is attached, are at the same potential. In the balancing operation normally contemplated, the resistances $V'$ and $V^2$ are relatively adjusted until the instrument $M'$ shows no potential difference between the points in the circuit branches 1 and 2 to which it is connected. When such adjustments are effected, the currents flowing in the circuits 1 and 2, respectively, are inversely proportional to the resistance values of the resistances $R'$ and $R^2$. Such relative current values can be secured only when the total resistance including the earth contact resistance at the point A of the energizing circuit branch, is in the same ratio to the total resistance including the earth contact resistance at D of the energizing circuit branch 2, as the ratio of the resistance values of the resistances $R'$ and $R^2$. The fixed resistances $R^3$ and $R^4$ are definitely related in the same manner as that described with respect to the resistances $R'$ and $R^2$. Each of these resistances $R^3$ and $R^4$ is connected as shown in Fig. 1, to the generator terminal Y. The total resistance including the earth contact resistance of the energizing circuit branch 3 is made equal to that of the energizing circuit branch 4 by varying the portions of the resistances $V^3$ and $V^4$ in the respective circuits until the sensitive galvanometer $M^2$ connected to the terminals of the resistances $R^3$ and $R^4$ remote from the generator terminal G indicates no potential difference.

When the total resistance in each energizing circuit branch has thus been definitely related to the total resistance in the other energizing circuit branch connected to the same terminal of the generator G in the manner described, the apparatus shown in Fig. 1 may be used in various ways to obtain observations which can be interpreted to furnish valuable information as to the subsurface composition of the earth underlying the field of observation including the energization points.

In one method of use, the apparatus shown in Fig. 1 is converted from its balancing condition into an observation condition by interchanging the connections between the energization circuit branches 1 and 4 and the generator G, so as to reverse the polarity of the energization points A and C. This is effected with the apparatus shown in Fig. 1, by adjustment of the switches $S'$ and $S^2$ each from its full line position into its dotted line position. In the dotted line position of the switch $S'$, the fixed resistance $R'$ is replaced in the energizing circuit 1 by a circuit portion 5 equal in resistance to the resistance $R'$ and connecting the switch $S'$, and thereby the energization point A, to the generator terminal Y. By adjusting the switch $S^2$ from its full line position into its dotted line position, the fixed resistance $R^4$ is replaced by a circuit portion 6 of equal resistance, which then connects the switch $S^2$, and thereby the energization point C, to the generator terminal X.

The described reversal of polarities of the energization points A and C leaves the total circuit resistance, including the earth contact resistance, between the generator terminal Y and the earth, equal to the total resistance between the generator terminal X and the earth. In consequence the portion of the energizing circuit external to the earth provides a means for establishing a base potential point or points which may be utilized in determining the character of the resistance of the portion of the earth underlying the observation field from the effect of that resistance on the distribution of the current flow through the earth resulting from the potentials established by the energization circuit at the energization points.

For the purpose of providing such a base potential point or points, the apparatus shown in Fig. 1 comprises a potentiometer resistance F connected between the generator terminals X and Y, and to an intermediate point of which, an exploring electrode E is connected by a circuit portion 7 including a sensitive galvanometer $M^3$ and a contact P engaging the potentiometer resistance. The essential characteristics of the observation or exploration condition of the apparatus just described, are shown in the simplified diagram of Fig. 2. Advantageously the contact P is adjustable to permit it to be connected to the potentiometer resistance F at different intermediate points of the latter, though in some cases the circuit portion 7 may be permanently connected to the mid-point or some other definitely determined intermediate point of the potentiometer resistance F. By adjusting the position of the exploring electrode E until the galvanometer $M^3$ indicates no current flow due to the external energization circuit a mid-potential point on the earth's surface between the energization points B and C may be located, provided the contact P is connected to the mid-point of the potentiometer resistance F. In addition to, or in lieu of the determination of such a mid-potential point, other observations of value may be made with the circuit arrangement shown in Fig. 1. For example, if, as a result of non-uniformity in earth resistance in different portions of the underlying earth, the mid-potential point does not coincide with the geographic point between the energization points B and C at which it would be located if the underlying earth were of uniform resistance, an indication of the current flow through the circuit conductor 7 afforded by the instrument $M^3$ when the exploring electrode E is located at said geographic point, may give valuable information in some cases.

Furthermore, if the resistances in the energizing circuit branches of the same polarity are different, so that the current flow between the earth and the external energizing circuit at the energization points of the same polarity are definitely different, useful information may be obtained by determining potential conditions at the surface of the earth between adjacent pairs of energization points. For example, if the current flow between the earth and the external energization circuits is two, or three, or four times as great at the energization points B and D, as at the energization points A and C, there will be a displacement of a readily locatable potential point between each adjacent pair of energization points produced by certain resistance conditions of the underlying earth which could not be detected or at least as readily detected with observations made when the current flow between the earth and the external energization circuit is the same at each energization point.

Thus, with the same current flow at each energization point, the mid-potential point would coincide with the geographic mid-point between the points B and C if the resistance below the exploration field were uniform in planes parallel to the earth surface regardless of how the earth resistance might vary, and in particular, even though the whole exploration field were underlaid by a body of oil containing sand having a specific resistance differing very much from the earth above it. With the current flow three times as great at the point B as at the point C, however, the presence of such an oil sand body would produce a marked change in the location of the mid-potential point on the line between the points B and C. Such a current distribution would result in shifting the mid-potential point through a definite distance toward the energization point C at which the current flow is the greater, if the underlying earth resistance were uniform in all directions. Such displacement of the mid-potential point from the geographic mid-potential point between the energization points is something which can be accurately calculated. The presence of the underlying oil sand would result in a displacement of the mid-potential point from this calculated position. In consequence the actual displacement of the mid-potential point would afford evidence of the existence of the oil sand body.

With the points A and B at the same polarity, there will be no mid-potential point, properly speaking, between the points A and B. However, there will be somewhere along the line connecting the points A and B a locatable point of minimum potential. With the current at the point B definitely greater than at the point A, the presence of an oil sand body underlying the exploration field, will result in a displacement of this point of minimum potential, from the point on the earth's surface at which it would exist if the underlying earth were of uniform resistance. With the current flows at the different energization definitely related, the location of the point of least potential for the condition of uniform resistance in the subjacent earth can be precalculated.

To determine the current flows through the different branches of the energization circuit, a separate current meter M⁴ may be provided in each energization circuit branch. As shown in Fig. 1, a switch S⁷ is associated with each meter M⁴ and is arranged so that in one position of the switch the corresponding energization branch is open, in a second position the energization branch is closed but does not include the corresponding meter M⁴, while in a third position the latter is included in the energization branch.

It is frequently desirable to make a number of observations with the energization points of opposite polarity separated by different distances but so relatively located that if the subjacent earth be of uniform resistance, the mid-potential point on the earth's surface would not be changed as a result of the differences in distance between energization points. With such location of the different energization points, a shift in the position of the mid-potential point produced by a change in the distance between the energization points affords useful information as to the depth, and sometimes as to the character and contour of a subjacent body of resistance different from that of the surrounding earth. Such observations with different distances between the energization points of different polarities are made with a minimum of trouble and expense when proceeding in accordance with the present invention. With the energization points A, B, C and D suitably spaced, the effect of one location of the energization points is obtained by utilizing only the energization points B and C as shown in Fig. 3. The effect of another location is obtained by using only the energization points A and D as shown in Fig. 4, and the equivalent for a location different from that shown in either Fig. 3 or Fig. 4 is obtained by energizing all four points as shown in Fig. 2, so that the points A and B are of one polarity and the points C and D are of the other polarity.

When, in progressing across a field of exploration, the observations made do not include observations made with the energized points spaced at different distances apart, the observation condition of the apparatus illustrated in Fig. 2 possesses an obvious advantage over those of Figs. 3 and 4, in that the energizing circuit resistance including the earth contact resistance is less with the multiple energizing branch arrangement shown in Fig. 2 than with those shown in Figs. 3 and 4. Because of the reduced resistance a given source of current can give stronger signals in the arrangement of Fig. 2, than in the arrangements of the other figures.

In taking observations along a roadway or other observation line, the various energization points A, B, C and D are successively advanced along the line. In practice, the different energization points A, B, C and D are advantageously similarly spaced in each of their successive locations, and advantageously, also, the distances between successive locations of any one of the points are the same. Such uniformity contributes to the ease and accuracy with which similarly made observations for each location can be collectively interpreted in determining the nature and character of changes in the earth resistance at different points along the exploration line.

Suitable precautions should be made to protect the sensitive instruments M', M², M³ and M⁴ against unusually large current flows during periods when the system is not in balance. To this end the switch S⁵ in series with the instrument M³ should be open when the apparatus is being balanced and the switches S³ and S⁴ in series with the instruments M' and M² are advantageously opened before the switches S' and S² are changed from their full line position into their dotted line positions.

The instruments M⁴ do not need to be as sensitive as the other instruments. They nevertheless may be advantageously left out of circuit until a condition of approximate resistance balance in the energizing circuit is obtained.

In practice, we preferably employ an automatic controller K for adjusting the various switches S', S², etc. in proper sequence, and so as to provide balancing and energizing periods of predetermined duration. Furthermore, this controller may be arranged to reverse the polarity of the energized points at definite intervals during each observation period so as to neutralize or compensate for the effect of earth currents. The controller K may well be a motor operating device controlling the various switches S', S², etc. through relays and control circuits for the latter directly controlled by the device K, but as the character of the controlling device K and its associated parts form no part of the present invention, and inasmuch as various instrumentalities suitable for the purpose are known, additional illustration or description in this connection seems unnecessary.

While in accordance with the provisions of the statutes we have illustrated and described the best form of embodiment of our invention now known to us, it will be apparent to those skilled in the art that changes may be made in the form of the apparatus disclosed without departing from the spirit of our invention as set forth in the appended claims and that in some cases certain features of our invention may be used to advantage without a corresponding use of other features.

Having now described our invention, what we claim as new and desire to secure by Letters Patent is:—

1. In electrical prospecting, the method which consists in connecting four points of earth energization arranged in a row to individual branches of an energization circuit system, connecting two of said branches in parallel to one side, and the other two branches in parallel to the other side of a source of potential difference, adjusting resistances in said branches as required to equalize the current flows in the different branches and then changing the connections between some of said branches and said source of potential difference to reverse the polarity of one or more of said points without changing the resistance including the earth contact resistance between the earth and the source of current of the different branches.

2. In electrical prospecting, the method which consists in connecting four points of earth energization arranged in a row along the earth surface to individual branches of an energization circuit system, connecting two of said branches in parallel to one side, and the other two branches in parallel to the other side of a source of potential difference, adjusting resistances in said branches to definitely proportion the resistances including the earth contact resistance, in the two branches of each pair of the same polarity, and then altering the connections between the different branches and said source of current to thereby create a potential difference first between two energization points separated by one distance, and then between two points separated by another distance.

3. In electrical prospecting, the method which consists in connecting four points of earth energization arranged in a row to individual branches of an energization circuit, connecting two of said branches in parallel to one side, and the other two branches in parallel to the other side of a source of potential difference, adjusting resistances in said branches until the two branches of the same polarity are of definitely proportioned total resistance, then successively altering the connections between said branches and said source of current so that during each of different periods two of said branches are disconnected from said source and the other two branches are connected to opposite sides of said source, and during each such period one at least of the branches connected to said source is disconnected therefrom during another of said periods.

4. In electrical prospecting, the method which consists in connecting four points of earth energization arranged in a row of individual branches of an energization circuit, connecting two of said branches in parallel to one side, and the other two branches in parallel to the other side of a source of potential difference, adjusting resistances in said branches until the two branches of the same polarity are of definitely related total resistance, and then disconnecting from said source of current two branches previously connected in parallel to one side of said source and changing the connection of one of the remaining branches to said source so as to reverse the polarity of the last mentioned branch.

5. In electrical prospecting, the method which consists in connecting four points of earth energization arranged in a row to individual branches of an energization circuit, successively energizing all four branches from a common source of potential difference in such manner as to connect each branch in parallel first with one and then with another of the other branches and adjusting resistances in said branches during each energization thereof until the two branches of each pair then in parallel are of definitely related total resistance, and then adjusting the connections between the different branches and the source of current to first create a potential difference between two of said energization points, and thereafter to create a potential difference between a different pair of said energization points, in each case with two of the four energization points disconnected from said source of current.

6. In electrical prospecting, the method which consists in connecting four points of earth energization arranged in a row to individual branches of an energization circuit, adjusting resistances in said branches until the total resistance of each branch including the corresponding electrode contact resistance is definitely related to the corresponding total resistance of each other branch, and then creating a potential difference first between two of said electrodes and then between another pair of the four electrodes in each case with two of the four energization points disconnected from said source of current.

Signed at New York city, in the county of New York and State of New York, this 28th day of August, A. D. 1928.

CHARLES RODNEY NICHOLS.
SAMUEL H. WILLISTON.